United States Patent [19]
Nakano

[11] 3,995,296
[45] Nov. 30, 1976

[54] LEAK-PROOF LIGHT INTERCEPTING DEVICE

[75] Inventor: Yoshiyuki Nakano, Tokyo, Japan
[73] Assignee: Nippon Kogaku K.K., Tokyo, Japan
[22] Filed: June 12, 1975
[21] Appl. No.: 586,411

[30] Foreign Application Priority Data
June 24, 1974 Japan.................. 49-73128[U]

[52] U.S. Cl. ................................. 354/241; 354/288
[51] Int. Cl.² .................... G03B 1/42; G03B 17/00
[58] Field of Search .................... 354/241, 277, 288

[56] References Cited
UNITED STATES PATENTS

| | | | |
|---|---|---|---|
| 1,003,536 | 11/1911 | Spinks | 354/241 |
| 2,522,347 | 9/1950 | Conviser et al. | 354/277 |
| 3,537,376 | 11/1970 | Fleming | 354/277 |

*Primary Examiner*—Joseph F. Peters, Jr.
*Attorney, Agent, or Firm*—Fitzpatrick, Cella, Harper & Scinto

[57] ABSTRACT

A light-intercepting member for preventing passage of transmitted light through those parts other than the opening of a focal plane shutter in a camera from reaching the surface of photographic film, is formed of a thin film of rubber and a cloth curtain of synthetic material adhered to at least one surface of the thin rubber film, is positioned in parallel with the travelling direction of the focal plane shutter, and is caused to contact the shutter curtain surface to intercept light other than light effective for photographing.

4 Claims, 3 Drawing Figures

LEAK-PROOF LIGHT INTERCEPTING DEVICE

BACKGROUND OF THE INVENTION

1. Field of the Invention

This invention relates generally to a focal plane shutter construction in a single lens reflex camera, and more particularly, it is concerned with a leak-proof device for intercepting harmful light liable to intrude into a film accommodating part of the camera through clearances existing in the moving part of the shutter.

2. Description of the Prior Art

In order to permit the focal plane shutter in a single lens reflex camera to operate, clearances for its movement are provided between the camera body and the shutter curtain. When the camera is used in a bright area, particularly when lens interchanging is done under sunlight, oblique light rays entering into the lens are irregularly reflected at the plane within the light-transmitting frame of the camera body, and such reflected light rays may pass through the abovementioned clearances to create fogging on the film surface, even if the shutter is in its closed position.

This difficulty has been recognized in the art, and efforts have been made to overcome same. Thus, there has been adopted a technique of intercepting the harmful light tending to pass through the clearances by providing within such clearances a light-leakage preventive device having a light-intercepting member attached thereto. More specifically, according to known techniques, the harmful light has been intercepted either by (1) attaching velveteen to the camera body within the clearances or to the outer surface of the mirror box to cause the upright short pile of the velveteen to contact the shutter curtain, or (2) by attaching one side edge of a rubber-coated cloth curtain such as a laminate of silk cloth and rubber material like buyl rubber, nitrile rubber, etc. to the camera body or the outer surface of the mirror box, and causing the other side edge of the rubber-coated cloth curtain to contact the shutter curtain.

However, the abovementioned first case, in which the velveteen is employed, has a defect such that if an attempt is made to improve the light-intercepting characteristics of the shutter, increase in the contact area and contact pressure between the velveteen and the shutter curtain would occur with the consequent reduction or irregularity in the speed of movement of the shutter curtain.

To reduce such contact area and pressure between the velveteen and the shutter curtain, the side edge of the rubber-coated cloth curtain may be linearly contacted with the surface of the shutter curtain to effect the light-interception. However, such rubber-coated cloth curtain having a silk base available at present has not sufficient strength to withstand friction or abrasion during the take-up or movement of the shutter curtain, and is liable to fray, wherefor it is not sufficiently durable for practical use.

To compensate for this defect, the rubber-coated curtain has been made in the form of a pocket or a deformed cylinder with its protuberant surface, not its side edge, contacting the shutter curtain. However, even this method is disadvantageous in that not only the contact area and contact pressure between the rubber-coated cloth curtain and the shutter curtain increases, but also the state of contact therebetween becomes unstable and non-uniform.

SUMMARY OF THE INVENTION

I have conceived by the present invention means whereby I am able to eliminate the above-noted disadvantages, and to provide a leak proof, light-intercepting member which will not fray even if the side edge of the cloth curtain is brought into line-contact with the shutter curtain, and which is very durable.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

BRIEF DESCRIPTION OF THE DRAWINGS

Specific embodiments of the invention has been chosen for purposes of illustration and description, and are shown in the accompanying drawings forming a part of the specification wherein.

DESCRIPTION OF THE PREFERRED EMBODIMENTS

According to the present invention, the cloth material used for the rubber-coated cloth curtain may be formed of chemical fibers such as synthetic fibers which are high molecular weight compounds.

The synthetic materials include polyester (sold under a trade name TETORON), polyamide (NYLON), polyvinyl alcohol (VINYLON), polyvinyl chloride, polyacrylic resin, etc. These materials are generally stronger than conventional silk and also have good anti-friction as well as weather-resistant properties.

Figure 1:
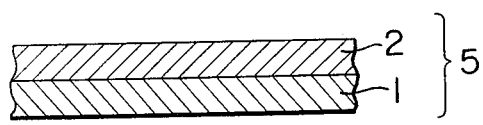
FIGS. 1 and 2 are respectively cross-sectional views of the light-intercepting members according to the present invention.
Figure 2:
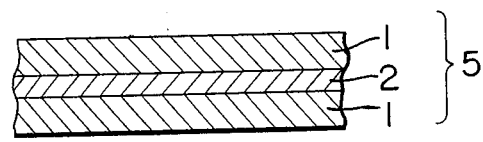

FIGS. 1 and 2 indicate two forms of a light-intercepting member according to the present invention. In FIG. 1, synthetic material such as Teteron, or the like, is employed as the cloth curtain 1 of the light-intercepting member, on which silicone rubber that remains flexible even at a very low temperature of -40° C is applied as a rubber-coating 2 to enhance the cold-resistance of the cloth curtain.

The light-intercepting member shown in FIG. 2, like that shown in FIG. 1, uses the abovementioned synthetic material for the cloth curtain 1 and silicone rubber for the rubber coating 2, but differs from the FIG. 1 construction in that cloth curtain 1 of the synthetic material is coated on both surfaces of the silicone rubber 2 with a view to preventing occurence of so-called "bi-material phenomenon" which tends to occur at very high and very low temperatures due to the difference in the linear expansion coefficient usually existing between the synthetic material and the rubber.

Figure 3:
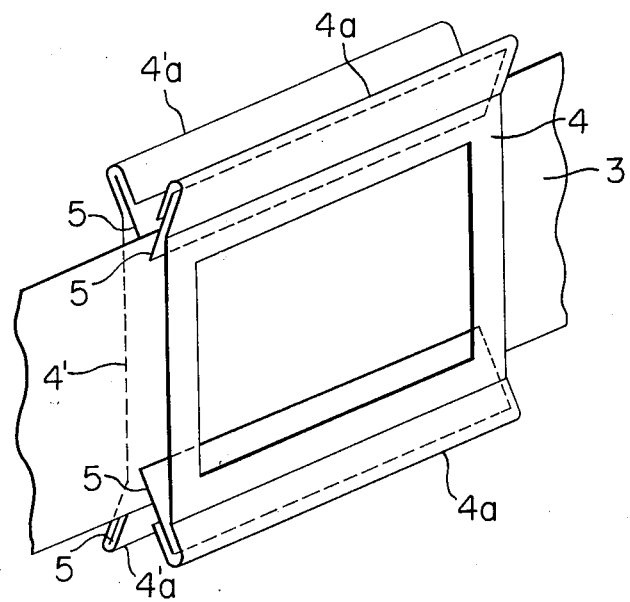
FIG. 3 is a perspective view of the light-intercepting member of the present invention when applied to a light-leakage preventive device.

An embodiment of the leak-proof light-intercepting member of the present invention as applied to the light-leakage preventive device for a focal plane shutter, will now be described in connection with FIG. 3, wherein numeral 3 designates a focal plane shutter curtain of the horizontal movement type, and numeral 4 and 4' denote fitting members for the abovementioned light-intercepting member, each having a picture-taking opening. The fitting members 4 and 4' are respectively provided with holding parts 4a and 4a' formed along the lateral side edges thereof coincident with the direction of movement of the shutter curtain 3, the holding parts 4a and 4a' being outwardly oblique with respect to the plane of the shutter curtain, and the edges thereof being inwardly folded to pinch the light intercepting member 5. Each of these holding parts 4a and 4a' thus holds one edge of the above-described light-intercepting member 5 in a sandwich like fashion. The other free side edge of each light-intercepting member 5 maintains a slight line-contact with the shutter curtain 3 in its moving direction.

The fitting member 4 is secured to the side of the shutter curtain in the mirror box (not shown) and the fitting member 4' is secured at the periphery of the picture-taking opening which is adjacent to the film surface side.

The light-intercepting member would most usually be attached by means of adhesive. However, the pinch-holding method as in the present embodiment, is more effective in preventing the material from fraying in comparison with such method of fixing only one surface of the rubber-coated cloth curtain by adhesive, thus contributing a corresponding increase in its durability, because the edge of the cloth curtain is firmly nipped by the holding part. Also, a desirable expedient for fitting the light-intercepting member would be to directly utilize the mirror box, or the camera body behind the shutter curtain, but utilization of a separate fitting member as in the present embodiment improves the working efficiency as compared with the aforementioned method of direct fitting.

According to the present invention, as described above, by using synthetic materials as the cloth curtain for the light-intercepting member, one side edge of which keeps a line-contact with the surface of the focal plane shutter curtain, fraying of the material is eliminated, and the leak-proof light-intercepting member of highly durable quality can be obtained.

I believe that the construction and operation of my novel leak-proof light-intercepting member will now be understood and that the advantages thereof will be fully appreciated by those persons skilled in the art.

I claim:

1. In a camera comprising:
a camera body;
a picture-taking opening provided in said camera body; and
a focal plane shutter curtain mounted for movement across said picture-taking opening;
a light-intercepting device for preventing light from passing through a clearance between said shutter curtain and said camera body, which comprises:
a pair of flexible, opaque, flat light-intercepting members disposed on each side of said shutter curtain, each member of each pair having a rectilinear edge portion and being composed of a thin film of rubber and a cloth curtain of synthetic material adhered to at least one surface of said thin film of rubber; and
support means for securely supporting said each member of each pair of light-intercepting members at the vicinity of said picture-taking opening, the rectilinear edge of portions of each of said light-intercepting member being in resilient and line contact with a side of said shutter curtain and at an angle with respect to the plane of movement of said shutter curtain.

2. A light-intercepting device as set forth in claim 1, wherein said support means comprises: a fitting member which is separable from the camera, having a picture-taking opening and a pair of fitting parts each for supporting a light-intercepting member.

3. A light-intercepting device as set forth in claim 1, wherein said cloth curtain of synthetic material is adhered to both surfaces of said thin film of rubber.

4. A light-intercepting device as set forth in claim 2, wherein said cloth curtain of synthetic material is adhered to both surfaces of said thin film.

* * * * *

UNITED STATES PATENT AND TRADEMARK OFFICE
CERTIFICATE OF CORRECTION

PATENT NO. : 3,995,296
DATED : November 30, 1976
INVENTOR(S) : YOSHIYUKI NAKANO

It is certified that error appears in the above-identified patent and that said Letters Patent are hereby corrected as shown below:

Column 1, line 60, after "rubber-coated" insert -- cloth --.
Column 2, line 47, after "generally" insert -- much --.
Column 4, line 44, after "thin film", insert -- of rubber --.

Signed and Sealed this

Fifteenth Day of March 1977

[SEAL]

Attest:

RUTH C. MASON
Attesting Officer

C. MARSHALL DANN
Commissioner of Patents and Trademarks